United States Patent
Hasz et al.

(10) Patent No.: US 6,637,643 B2
(45) Date of Patent: *Oct. 28, 2003

(54) METHOD OF APPLYING A BOND COATING AND A THERMAL BARRIER COATING ON A METAL SUBSTRATE, AND RELATED ARTICLES

(75) Inventors: Wayne Charles Hasz, Pownal, VT (US); Marcus Preston Borom, Tuscon, AZ (US); Warren Arthur Nelson, Clifton Park, NY (US); James Edward Viggiani, Piedmont, SC (US); John Zanneti, Gray Court, SC (US)

(73) Assignee: General Electric Company, Niskayuna, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/066,889

(22) Filed: Feb. 4, 2002

(65) Prior Publication Data

US 2002/0102409 A1 Aug. 1, 2002

Related U.S. Application Data

(62) Division of application No. 09/411,222, filed on Oct. 4, 1999, now Pat. No. 6,387,527.

(51) Int. Cl.[7] .............................. B23K 31/02; B23P 6/00
(52) U.S. Cl. ........................ 228/119; 228/245; 228/254; 427/124; 427/142; 427/156; 29/17.2; 29/402.13; 29/889.1
(58) Field of Search ................................ 228/254, 261, 228/121, 122.1, 119, 125, 245; 427/123, 124, 142, 154, 156; 29/17.2, 889.1, 402.11, 402.13, 402.09

(56) References Cited

U.S. PATENT DOCUMENTS

| | | | |
|---|---|---|---|
| 3,293,072 A | | 12/1966 | Doolittle et al. |
| 3,490,116 A | | 1/1970 | Cape |
| 3,876,447 A | | 4/1975 | Lally |
| 4,152,223 A | * | 5/1979 | Wallace et al. ............. 148/518 |
| 4,655,383 A | | 4/1987 | Fournes et al. |
| 4,726,101 A | | 2/1988 | Draghi et al. |
| 4,842,953 A | * | 6/1989 | Perkins et al. .............. 428/553 |
| 5,464,699 A | * | 11/1995 | Baldi ......................... 428/607 |
| 5,523,169 A | | 6/1996 | Rafferty et al. |
| 5,549,927 A | | 8/1996 | Cottone et al. |
| 5,683,825 A | * | 11/1997 | Bruce et al. ................. 428/698 |
| 5,952,042 A | | 9/1999 | Rafferty et al. |
| 6,302,318 B1 | * | 10/2001 | Hasz et al. .................. 228/254 |
| 6,387,527 B1 | * | 5/2002 | Hasz et al. .................. 428/472 |
| 6,398,103 B2 | * | 6/2002 | Hasz et al. .................. 228/119 |
| 2002/0102409 A1 | * | 8/2002 | Hasz et al. |

FOREIGN PATENT DOCUMENTS

| | | |
|---|---|---|
| CH | 674650 | 6/1990 |
| DE | 3638088 | 5/1988 |
| DE | 3930859 | 4/1990 |
| EP | 856375 A1 | 8/1998 |

OTHER PUBLICATIONS

US 2002/0102409A1 Hasz et al. (Aug. 1, 2002).*
Japanese Patent Abstract, Derwent Publications, 1994–186308, XP–002158152.

* cited by examiner

Primary Examiner—Tom Dunn
Assistant Examiner—Kiley Stoner
(74) Attorney, Agent, or Firm—Paul J. DiConza; Patrick K. Patnode

(57) ABSTRACT

A method for applying at least one bond coating on a surface of a metal-based substrate is described. A foil of the bond coating material is first attached to the substrate surface and then fused thereto, e.g., by brazing. The foil is often initially prepared by thermally spraying the bond coating material onto a removable support sheet, and then detaching the support sheet. Optionally, the foil may also include a thermal barrier coating applied over the bond coating. The substrate can be a turbine engine component.

32 Claims, No Drawings

METHOD OF APPLYING A BOND COATING AND A THERMAL BARRIER COATING ON A METAL SUBSTRATE, AND RELATED ARTICLES

This application is a Divisional application Ser. No. 09/411,222 filed Oct. 4, 1999, now U.S. Pat. No. 6,387,527.

This invention was made with government support under Contract No. DEFC21-95MC311 76 awarded by DoE. The government may have certain rights to the invention.

BACKGROUND OF THE INVENTION

This invention generally relates to bond coatings and thermal barrier coatings applied to metals, e.g., metal components used in turbine engines. In some specific embodiments, it relates to improved techniques for applying such coatings to surfaces where access is difficult.

Metal components are used in a wide variety of industrial applications, under a diverse set of operating conditions. In many cases, the components are provided with coatings which impart various characteristics, such as corrosion resistance, heat resistance, oxidation resistance, and wear resistance. As an example, the various components of turbine engines, which typically can withstand in-service temperatures in the range of about 1100° C.–1150° C., are often coated with thermal barrier coatings (TBC's), to effectively increase the temperature at which they can operate.

Most TBC's are ceramic-based, e.g., based on a material like zirconia (zirconium oxide), which is usually chemically stabilized with another material such as yttria. For a jet engine, the coatings are applied to various superalloy surfaces, such as turbine blades and vanes, combustor liners, and combustor nozzles. Usually, the TBC ceramics are applied to an intervening bond coating (sometimes referred to as a "bond layer", "bond coat", or "bond coat layer") which has been applied directly to the surface of the metal part. The bond coating is often critical for improving the adhesion between the metal substrate and the TBC.

The effectiveness of a TBC coating is often measured by the number of thermal cycles it can withstand before it delaminates from the substrate which it is protecting. In general, coating effectiveness decreases as the exposure temperature is increased. The failure of a TBC is often attributed to weaknesses or defects related in some way to the bond coating, e.g., the microstructure of the bond coating. TBC failure can also result from deficiencies at the bond coat-substrate interface or the bond coat-TBC interface.

The microstructure of the bond coating is often determined by its method of deposition. The deposition technique is in turn often determined by the requirements for the overlying protective coating. For example, many TBC's usually require a very rough bond coat surface for effective adhesion to the substrate. An air plasma spray (APS) technique is often used to provide such a surface.

While the APS process has several advantages, it also results in a porous coating microstructure. Such a microstructure allows significant internal oxidation of the bond coating. The oxidation of regions of the bond coating often reduces the concentration of aluminum in other bond coat regions. This phenomenon can in turn result in the diffusion of aluminum from an adjacent, aluminum-containing substrate, e.g., a superalloy. The depletion of aluminum from a superalloy substrate is especially severe when the component is used at the elevated temperatures described above. The loss of aluminum can be detrimental to the integrity of superalloy components.

In a pending U.S. patent application of M. Borom, et al., Ser. No. 09/385,544, now U.S. Pat. No. 6,165,628 problems associated with the microstructure of porous bond coats are addressed. In one embodiment of the reference, a bi-layer is used to bond a TBC to a metal substrate. The bi-layer includes a dense, primary bond coating over the substrate, and a "spongy" secondary bond coating over the dense coating. The primary bond coating is usually applied by a vacuum plasma spray (VPS) or high velocity oxy-fuel (HVOF) technique. The spongy, secondary bond coating is usually applied by an air plasma spray technique. The primary bond coating helps to protect the substrate from excessive oxidation. The secondary bond coating promotes adhesion between the primary coating and the subsequently-applied TBC, while also acting as a strain-reliever between these two other coatings. The resulting TBC system exhibits high integrity during exposure to high temperatures and frequent thermal cycles.

Clearly, the various thermal spray techniques mentioned above are quite suitable for applying bond coatings to many substrates. However, they are sometimes not effective for applying the coatings to regions of a substrate which are somewhat inaccessible, since the spray equipment may be too large and cumbersome for such regions. For example, it can be very difficult to thermally spray a bond coating on a flange or other surface of a turbine engine part. Moreover, the spray process, which may include one or more masking steps, is sometimes very time-consuming. It is often very difficult to carry out local repairs using this process.

Thus, new methods for efficiently applying bond coatings and TBC's to inaccessible regions of a substrate would be welcome in the art. The methods should also be capable of providing a bond coating microstructure which protects the substrate from excessive oxidation. The methods should result in bond coats which provide a desirable level of adhesion between the substrate and a subsequently-applied TBC. The overall TBC should be effective in protecting components used in high performance applications, e.g., superalloy parts exposed to high temperatures and frequent thermal cycles. It would also be desirable if the methods were generally compatible with conventional application equipment, e.g., various plasma spray techniques.

SUMMARY OF THE INVENTION

One embodiment of this invention is a method for applying at least one bond coating to a surface of a metal-based substrate, comprising the following steps:

(a) attaching a foil which comprises the bond coating to the substrate surface, and then (b) fusing the foil to the substrate surface, so that the bond coating adheres to the substrate.

The foil is often prepared by thermally spraying the bond coating material onto a removable support sheet. Exemplary thermal spray techniques are vacuum plasma deposition (VPS), high velocity oxy-fuel (HVOF), and air plasma spray (APS). When the support sheet is removed, the free-standing foil of bond coating material remains.

The free-standing foil is typically fused to the substrate surface by a brazing or welding process. Various brazing techniques are possible. As an example, a slurry of the braze composition can be applied to a surface of the foil, which is then attached to the substrate surface, with the braze composition contacting the substrate. The braze composition is then exposed to a suitable brazing temperature. An alternative technique involves applying the braze slurry to the substrate surface first. The foil is then attached to the slurry-coated substrate, followed by brazing. As still another alternative, a green braze tape cart be used to attach the foil to the substrate surface, followed by brazing.

The bond coating usually comprises an alloy of the formula MCrAlY, where M is selected from the group consisting of Fe, Ni, Co, and mixtures of any of the foregoing. In some embodiments of the invention, the foil is made from at least two bond coatings. For example, it can be based on a dense, primary bond coating and a "spongy" secondary bond coating over the dense coating, as further described below.

Moreover, other embodiments of this invention include the application of a thermal barrier coating applied over the bond coating on the removable support sheet. The TBC is usually zirconia-based, and can be applied over the bond coating by various techniques, such as a plasma spray process. Thus, the free-standing foil in this embodiment would include both a bond coating (or multiple bond coatings) and the TBC.

Yet another embodiment of this invention includes a method for repairing a worn or damaged thermal barrier coating system applied over a metal-based substrate. The method includes the step of removing the worn or damaged system (i.e., including at least one bond coating and the TBC), followed by replacement of the coating system, using the free-standing foil mentioned above. As described previously, the foil is usually cut to the desired shape and brazed to the substrate surface.

Still another embodiment of this invention relates to an article which includes a metal-based substrate, such as a superalloy component of a turbine engine. The article further includes a foil which comprises at least one bond coating, fused to the substrate. The foil may also include a TBC. As mentioned previously, the foil is preferably fused to the substrate by an intervening coat of braze material.

The invention and its various embodiments are more particularly described in the following detailed description.

DETAILED DESCRIPTION OF THE INVENTION

Various types of bond coatings can be applied by the method of the present invention. The compositions for such layers are well-known in the art. Very often, the bond coatings are formed of an MCrAlY material, where "M" can be various metals or combinations of metals, such as Fe, Ni, or Co. Some of the preferred alloys of this type have a broad composition (in weight percent) of about 17% to about 23% chromium; about 4% to about 13% aluminum; and about 0.1% to about 2% yttrium; with M constituting the balance. In some embodiments, M is a mixture of nickel and cobalt, wherein the ratio of nickel to cobalt is in the range of about 10:90 to about 90:10, by weight.

As mentioned above, the bond coating material is used in the form of a foil, i.e., a thin sheet which is sometimes referred to as a "coating pre-form". The thickness of the foil depends in large part on the desired thickness of the bond coating or bond coatings. In general, the total thickness of the foil is usually in the range of about 25 microns to about 900 microns, and preferably, in the range of about 100 microns 500 microns (in the absence of any TBC, and after surface finishing, e.g., grinding).

The bond coating foil can be made by a variety of techniques. For example, the bond coating material, usually in the form of a powder, can be deposited onto a removable support sheet (typically metallic) as a thin layer of metal. In some embodiments, the support sheet is actually a removable substrate, e.g., a replica or duplicate of the "final substrate" (the component requiring the bond coating). Thus, the support sheet would contain all of the curvatures of the final part. As described below, several techniques can be used to subsequently detach the foil from the support sheet. When the free-standing foil is detached, it contains all of the curvatures of the support sheet.

Various thermal spray techniques are usually employed for the deposition of the bond coating powder onto the removable support sheet. Examples include YES, HVOF, or APS. Other deposition techniques could be used as well, such as sputtering or physical vapor deposition (PVD). As one specific illustration, HVOF techniques are known in the art and described, for example, in U.S. Pat. Nos. 5,508,097 and 5,527,591, both incorporated herein by reference. HVOF is a continuous combustion process in which the powder is injected into the jet stream of a spray gun at very high speeds. Those of ordinary skill in the art are familiar with various HVOF details, such as the selection of primary gasses, secondary gasses (if used), and cooling gasses; gas flow rates: power levels; coating particle size, and the like.

As another illustration, plasma spray techniques are also known in the art and described, for example, in the Kirk-Othmer *Encyclopedia of Chemical Technology*, 3rd Edition, Vol. 15, page 255, and references noted therein. U.S. Pat. Nos. 5,332,598; 5,047,612; and 4,741,286 are also instructive in regard to various aspects of plasma spraying, and are incorporated herein by reference. In general, the typical plasma spray techniques involve the formation of a high-temperature plasma, which produces a thermal plume. The coating material, in the form of a powder, is fed into the plume. The powder particles melt in the plasma and are accelerated toward the substrate being coated. (If the process is carried out in an air environment, it is often referred to as APS.) Those of ordinary skill in the plasma spray coating art are familiar with various details which are relevant to applying the coating, e.g., plasma spray parameters such as spray distances (gun-to-substrate); selection of the number of spray-passes; powder feed rate, torch power, plasma gas selection; and the like.

Information regarding the other deposition techniques (e.g., vacuum plasma deposition, sputtering, PVD, and the like) is also readily available. Those of skill in the art will be able to select particular operating conditions for using each of these techniques to deposit a foil of the bond coating material on the support sheet.

As mentioned previously, the foil may comprise at least two bond coatings. As an example, it may include a dense, primary bond coating, and a secondary bond coating which has a "spongy" microstructure. The use of such a bi-layer under certain application conditions results in a very desirable combination of coating properties, as further described herein. This type of bi-layer is also described in the afore-mentioned pending patent application of M. Borom et al, Ser. No. 09/385,544 now U.S. Pat. No. 6,165,628 herein referred to as "the Borom application", which is incorporated herein by reference.

The dense, primary bond coating may be applied to the removable support sheet by various techniques, such as a vacuum plasma spray technique or an HVOF technique. Vacuum plasma systems are known in the art. They are often powered by direct current, and the process is carried out in a low-pressure environment, e.g., at about 20 torr to about 60 torr, with greatly reduced levels of oxygen. These parameters minimize the level of oxide inclusion, because there is much less oxygen available for accumulation onto the molten coating particles. A conventional vacuum plasma spray gun can be used, e.g., an EPI 03CA gun from Electroplasma (Sulzer-METCO, Inc.). Other details are provided in the aforementioned referenced application of M. Borom et al. HVOF techniques were described previously.

The dense, primary bond coating may be applied to the removable support sheet by various techniques, such as a vacuum plasma spray technique or an HVOF technique. Vacuum plasma systems are known in the art. They are often powered by direct current, and the process is carried out in a low-pressure environment, e.g., at about 20 torr to about 60 torr, with greatly reduced levels of oxygen. These parameters minimize the level of oxide inclusion, because there is much less oxygen available for accumulation onto the molten coating particles. A conventional vacuum plasma spray gun can be used, e.g., an EPI 03CA gun from Electroplasma (Sulzer-METCO, Inc.). Other details are provided in the referenced application of M. Borom et al, Ser. No. 09/385,544 now U.S. Pat. No. 6,165,628. HVOF techniques were described previously.

The thickness of the dense, primary bond coating will depend in part on the conditions to which the final, coated article will be subjected, as well as other factors such as the level of oxidation protection required for the article. Usually, the thickness will be in the range of about 100 microns to about 400 microns, and preferably, in the range of about 200 microns to about 300 microns.

For the bi-layer-embodiment, the secondary bond coating often includes an open network of interconnected pores, as described in the aforementioned Borom application. The pores are generally located between layers of oxide which are entrained on particles of the bond coating material. This microstructure (which could be described as "spongy") is in direct contrast to the dense bond coatings which were thought to be desirable in the prior art.

The bond coating microstructure may be characterized by "line length", i.e., the sum of the strings of entrained oxide (i.e., lengths of porosity) in a given section of the coating. Such a measurement can be obtained by an image analysis of the section, as described the aforementioned Borom application. In preferred embodiments, the microstructure of the spongy bond coating has at least about 225 continuous strings of oxide greater than 25 microns in length, per square millimeter of sample (viewed in cross-section), as measured by an optical microscope, 1500× magnification. In some especially preferred embodiments, the bond coating microstructure will have at least about 300 continuous oxide strings greater than 25 microns in length. (In contrast, the dense primary bond coating usually has less than about 200 continuous strings of oxide greater than 25 microns in length, per square millimeter of sample). (As described in the Borom application, the extent of porosity is sometimes also related to the oxide inclusion level). The spongy, secondary bond coating is usually applied by a thermal spray technique, such as the plasma spray process described previously.

The thickness of the secondary bond coating will depend on various factors, such as the oxidation protection and corrosion protection desired for the component, as welt as material costs. The shape and size of the part may also be considered, since the thickness of the bond coating should not exceed dimensional tolerances in general, the thickness wilt be in the range of about 50 microns to about 500 microns, and preferably, in the range of about 100 microns to about 400 microns. In especially preferred embodiments, the thickness will be in the range of about 200 microns to about 300 microns.

Other bi-layer bond coating systems are possible. As an example, a primary bond coating of the MCrAlY-type could first be applied to a removable support sheet. An aluminide or noble metal-aluminide material (e.g., platinum-aluminide) coating could then be applied over the primary bond coating, as a secondary bond coating. Various techniques are available for applying such materials, e.g., pack aluminiding. In one preferred embodiment for a platinum-aluminide coating, the platinum is first electroplated onto the primary bond coating, i.e., onto a foil of the primary bond coating which is usually attached to the removable support sheet. Electroplating of this type is often carried out with conventional P-salt or Q-salt electroplating solutions. In the second step, the platinum layer is diffusion-treated with aluminum vapor to form platinum aluminide. This exemplary foil thus includes a primary layer of MCrAlY, and a secondary bond coating of platinum-aluminide.

As still another alternative, a three-layer bond coating system could be applied over the removable support sheet. For example, a dense, primary bond coating could first be deposited, followed by the deposition of a "spongy" secondary bond coating, as described previously. An aluminide or noble metal-aluminide coating could then be applied over the spongy, secondary bond coating as a third coating. In such an instance, this last-applied coating provides a measure of chemical resistance, while the two previously-deposited bond coatings perform the general functions described above.

After the bond coating or multiple bond coatings have been deposited, the support sheet is removed, leaving the desired, free-standing metal foil. Several different techniques can be used to remove the foil from the support sheet. For example, if the support sheet is intentionally not grit-blasted prior to deposition of the coating metal, adhesion of the metal to the support sheet will be relatively low, permitting easy detachment of the foil. Alternatively, a release coating can be applied to the removable support sheet prior to application of the bond coating material. Suitable release coatings are known in the art and available from Praxair, for example. As still another alternative, an etchable coating such as aluminum can be applied to the removable support sheet, prior to application of the bond coating material. After the bond coating material is applied, the coated support sheet can be treated in a bath of a solution which selectively etches the aluminum, e.g., aqueous potassium hydroxide. Removal of the aluminum layer results in detachment of the foil from the removable support sheet.

In some instances, the substrate surface to which the foil will be attached is very curved or somewhat irregular. In such a case, it may be desirable to provide the foil with a substantially identical shape. Relatively thin foils may be somewhat flexible, and can be bent to some degree to match the curvature of a substrate. Foils of greater thickness usually are not flexible, but can be shaped by other techniques. For example, the removable support sheet discussed above can initially be provided with the desired curvature of the substrate, prior to deposition of the coating material. (If a replica of the final substrate is used as the support sheet, it would already have the desired shape and curvature.)

Detachment of the removable support sheet results in a free-standing foil of the bond coating material. (As described above, the foil could be in the form of a single bond coating or several bond coatings, e.g., a spongy bond coating over a dense layer). The foil can then be cut to a size appropriate for the site on the substrate where the bond coating is desired, prior to being fused to the substrate. Various techniques can be used to temporarily hold the foil in place before fusing. For example, an adhesive could be used, i.e., one which completely volatilizes during the fusing step. Alternatively, the foil could be bolted, clamped, or tack-welded into place.

A variety of metals or metal alloys can be used as the substrate for the present invention. The term "metal-based" in reference to substrates disclosed herein refers to those which are primarily formed of metal or metal alloys, but which may also include some non-metallic components, e.g., ceramics, intermetallic phases, or intermediate phases. Usually, the substrate is a heat-resistant alloy, e.g., superalloys which typically have an operating temperature of up to about 1000–1150° C. (The term "superalloy" is usually intended to embrace complex cobalt- or nickel-based alloys which include one or more other elements such as aluminum, tungsten, molybdenum, titanium, and iron.) Superalloys are described in various references, such as U.S. Pat. Nos. 5,399,313 and 4,116,723, both incorporated herein by reference. High temperature alloys are also generally described in Kirk-Othmer's *Encyclopedia of Chemical Technology*, 3rd Edition, Vol. 12, pp. 417–479 (1980), and Vol. 15, pp. 787–800 (1981). Illustrative nickel-base superalloys are designated by the trade names Inconel®, Nimonic®, Rene® (e.g., Rene® 80-, Rene® 95 alloys), and Udimet®. The type of substrate can vary widely, but it is often in the form of a jet engine part, such as a turbine nozzle.

The fusing step for attaching the foil of bond coating material to the substrate can be carried out by various techniques. Very often, it is a brazing step, and is similar to any conventional brazing operation. (As used herein, "brazing" is generally meant to include any method of joining metals that involves the use of a filler metal or alloy.) One exemplary reference for details regarding brazing is the text *Modern Metalworking*, by J. R. Walker, The Goodheart-Willcox Co., Inc., 1965, pp. 29-1 to 30-24.

A variety of braze alloy compositions may be used for the present invention. Some of them are described in the Kirk-Othmer *Encyclopedia of Chemical Technology*, 3rd Edition, Vol. 21, pages 342 et seq. If the substrate is a nickel-base superalloy, the braze alloy usually contains at least about 40% by weight nickel. (Nickel-containing braze alloys or cobalt-containing braze alloys are usually used with cobalt-base superalloys). The braze alloy composition may also contain silicon and/or boron, which serve as melting point suppressants.

It should be noted that other types of braze alloys may be used, e.g., precious metal compositions containing silver, gold, and/or palladium, in combination with other metals, sirch as copper, manganese, nickel, chrome, silicon, and boron. Mixtures which include at least one of the braze alloy elements are also possible. Many of the metal braze compositions are available from Praxair Surface Technologies, Inc.

Various techniques for applying the braze alloy can be employed. For example, the braze alloy composition can be applied to the removable support sheet, prior to application of the bond coating composition. Various thermal spray techniques can be used to apply the braze composition to the removable support sheet, such as HVOF and APS. Other techniques can also be used, such as sputtering or PVD. When the removable support sheet is detached, the braze layer will remain attached to the underside of the bond coating, i.e., forming a double-layer (or "tri-layer" when two bond coatings are used) for fusing to the final substrate. In those Instances in which an etchable coating is employed (as discussed above), the braze composition would be applied after the etchable coating is deposited. The solution employed to attack the etchable coating should be one which will not adversely affect the braze composition or any of the bond coating compositions.

In an alternative technique for applying the braze alloy, a free-standing braze foil could be employed. Methods for making such braze foils are known in the art. Moreover, the braze foils are commercially available from various sources, such as Wesgo and Allied Signal Company. The braze foil can be tack-welded to the substrate, or an adhesive can be used. The foil of bond coating material can then be tack-welded or adhesively attached to the braze foil. Alternatively, the braze foil can first be attached to the bond coating foil, followed by the attachment of the joined foils to the substrate.

As still another alternative, a green braze tape could be used to attach the bond coating foil to the substrate. Such tapes are well-known in the art, and are commercially available, e.g., the AMDRY® line of tapes from Sulzer-METCO, Inc. They can be obtained with an adhesive on one or both sides, so that the tape can be, initially attached to either the substrate or the bond coating foil.

As another alternative, the braze material can be utilized in the form of a slurry which usually contains metal powder, binder, and optionally, solvent. A variety of binder materials may be used, e.g., water-based organic materials such as polyethylene oxide and various acrylics, or solvent-based binders. Conventional details related to the mixing of the slurry are described in various references, such as U.S. Pat. No. 4,325,754, which is incorporated herein by reference. Slurry compositions are also commercially available. Use of the braze slurry compositions is advantageous in various situations. For example, when the final substrate surface is irregular, or contains pits or crevices, the braze slurry can be used to fill such regions.

The braze slurry can be applied to the desired region of the final substrate, prior to placement of the free-standing bond coating foil over the braze slurry. Various techniques are available for applying the braze slurry composition. For example, it can be sprayed, painted, or tape-cast onto the final substrate. Alternatively, the braze slurry composition can be applied to the surface region of the foil which will contact the desired region of the substrate. In fact, the braze slurry composition could be applied to both the bond coating foil and the substrate region which will be in contact with the foil.

Those of ordinary skill in the art are familiar with other details regarding brazing. Brazing temperatures depend in part on the type of braze alloy used, and are typically in the range of about 525° C. to about 1650° C. In the case of nickel-based braze alloys, braze temperatures are usually in the range of about 800° C. to about 1260° C. When possible, brazing is often carried out in a vacuum furnace. The amount of vacuum will depend in part on the composition of the braze alloy. Usually, the vacuum will be in the range of about $10^{-1}$ torr to about $10^{-8}$ torr.

If the bond coating or multiple bond coatings are to be applied to an area which does not lend itself to the use of a furnace (e.g., when the component itself is too large to be inserted into a furnace), a torch or other localized heating means can be used. For example, a torch with an argon cover shield or flux could be directed at the brazing surface. Specific, illustrative types of heating techniques for this purpose include the use of gas welding torches (e.g., oxy-acetylene, oxyhydrogen, air-acetylene, air-hydrogen); RF welding; TIG (tungsten inert-gas) welding; electron-beam welding; resistance welding; and the use of IR lamps. As described above, green braze materials usually contain organic binders which are volatile. Care should be taken when using these types of heating techniques with the green brazes, to avoid the undesirable effects of out-gassing. For example, the heating step could be carried out very gradually. Moreover, one could select green tape compositions which have low volatile content. (Other alternatives are also possible, as described above, e.g., the use of metal braze foils without binders).

As mentioned previously, the fusing step can be carried out by techniques other than brazing. For example, a torch or other heating technique (e.g., the welding techniques mentioned above) can be used for fusing the bond coating foil to the substrate, as an alternative to the vacuum furnace. Regardless of what fusing technique is employed, the resulting bond coating is metallurgically bonded to the substrate, and exhibits the properties of bond coatings applied by prior art techniques.

The method described above can minimize or do away with time-consuming steps often found in prior art processes. For example, masking steps that are usually required when coating a part (or regions of a part) can be eliminated. Instead, the bond coating is formed "off-line", as the foil. The foil can be cut to precise dimensions and then brazed to the selected region of the part. In many instances, the brazing step can be advantageously carried out during another heating step normally carried out in the process. For example, the brazing step could be carried out during a solution heat-treatment step, or during a TBC heat-treatment step. (Braze alloys having melting temperatures similar to temperatures used in the other heating steps could be selected).

As mentioned previously, the foil used in the present invention can further include a thermal barrier coating, applied over the bond coating (or multiple bond coatings). Usually, the TBC is zirconia-based. As used herein, "zirconia-based" embraces ceramic materials which contain at least about 70% zircodia, by weight. Zirconia is a well-known compound for barrier coatings. Its use is described, for example, in Kirk-Othmer's *Encyclopedia of Chemical Technology*, 3rd Edition, V. 24, pp. 882–883 (1984). In preferred embodiments, the zirconia is chemically stabilized by being blended with a material such as yttrium oxide, calcium oxide, magnesium oxide, cerium oxide, scandium oxide, or mixtures of any of those materials. In one specific example, zirconia can be blended with about 1% by weight to about 20% by weight yttrium oxide (based on their combined weight), and preferably, from about 3%–10% yttrium oxide.

In some preferred embodiments, a plasma spray technique is employed to apply the TBC over the bond coating or multiple bond coatings. Suitable plasma-spray processes have been previously described herein, and in the various references. Again, those of ordinary skill in the art can selectively perform the routine preparation steps and adjust the various process parameters, e.g., plasma spray distances; the number of spray-passes; powder feed rate; powder particle size; and the like. Various other factors will be considered, such as the particular composition of the zirconia-based TBC, and the end use of the part being coated. The thickness of the TBC will depend in part on the particular component being coated. Usually its thickness will be in the range of about 125 microns to about 2500 microns. In preferred embodiments for end uses such as airfoil components, the thickness is often in the range of about 250 microns to about 1150 microns.

The application of a TBC by this method also provides many advantages over prior art processes. Again, masking steps can be eliminated because the entire TBC system—bond coating or multiple bond coatings with the TBC itself—is formed off-line as the foil. The foil can then be cut to the specific, desired dimensions, and brazed to the selected region of the substrate.

Another embodiment of this invention is directed to a method for repairing a worn or damaged TBC and bond coating (or set of bond coatings) which have been applied over the substrate. Careful repair of such layers is critical in preventing degradation of the substrate. In the case of a turbine engine component, for example, it may be necessary to repair the coating while the turbine is in service, i.e., after its delivery from the manufacturing site. The process disclosed herein provides a means for rapidly repairing or replacing selected areas of an existing TBC system (i.e., bond coating and thermal barrier coating), without having to completely remove the coatings from the entire part. The process is especially useful for repairing coatings which are situated in areas not easily accessible to other repair techniques. The steps usually comprise:

(i) removing the worn or damaged bond coating and TBC from a selected area on the substrate;

(ii) attaching a foil which comprises the replacement bond-coating and TBC to the substrate surface, covering the selected area; and then (iii) fusing the foil to the substrate, so that the bond coating and TBC adhere to the selected area on the substrate. (The bond coating-face of the foil is attached to the substrate, leaving the TBC-face exposed.)

The fusing step for this embodiment is often carried out by using a torch or other portable heating apparatus. In alternative embodiments, any of the individual bond coatings or TBC coatings could be deposited using the foil-attachment technique, while the other coatings are deposited in a conventional manner, e.g., thermally sprayed directly on the substrate.

Yet another aspect of this invention is directed to an article which comprises a foil of bond coating material fused to a metal-based substrate. The bond coating may include one layer or multiple layers, as described previously. The substrate can be formed of various materials, such as superalloys, and is often in the torn of a turbine engine component. The foil is usually fused to the substrate by an intervening braze layer, as described above. The braze layer usually has a thickness of about 2.5 microns to about 125 microns, and is usually no greater than about 25

The thickness of the foil (in this embodiment) will depend on the desired thickness of the bond coating or multiple bond coatings. Usually, the thickness is in the range of about 25 microns to about 900 microns, and preferably, in the range of about 100 microns to about 500 microns, after surface finishing. When the foil is fused to the substrate (i.e., a turbine component), it functions as a bond coating, protecting the designated portion of the substrate, as described previously.

It should be apparent from the preceding description that an additional embodiment is directed to an article which comprises a metal-ceramic foil of at least one bond coating and an overlying TBC, fused to a metal-based substrate. The foil is usually fused to the substrate by an intervening braze layer, as described previously. The TBC is often formed of a zirconia-based material, which is chemically stabilized as mentioned above. The thickness of the TBC-portion of the foil will depend on the desired thickness of the TBC layer itself, for the particular component being protected. Usually its thickness will be in the range of about 125 microns to about 2500 microns. In preferred embodiments for end uses such as airfoil components, the thickness is often in the range of about 250 microns to about 1150 microns.

The following examples are provided for illustration, and should not be considered to be any type of limitation on the scope of the present invention.

EXAMPLE 1

A gas turbine shroud formed of a nickel-based superalloy served as the substrate for this experiment. Prior to being coated, the surface of the shroud was purposefully not grit blasted (i.e., in contrast to typical processes), to minimize the adhesion of subsequently-applied coatings. A NiCrAlY-type bond coat was then air plasma-sprayed onto the surface the shroud. A thermal barrier coating (zirconia, with 8 wt. % by weight yttria) was then air plasma sprayed over the bond coat.

After the turbine part cooled, the deposited coating "popped" off as one continuous sheet, i.e., the foil. The free-standing foil contained the precise curvatures present in the original part. The foil was then cut with a water jet into individual test pieces (0.64 cm-wide strip; 2.54 cm disks). The free-standing disks were then brazed to a nickel-based superalloy substrate, using Amdry™ 100 green braze tape, available from Sulzer-METCO, Inc. (The tape was about 0.005 inch/0.013 cm thick).

The green braze tape was sandwiched between the free-standing foil and the metal substrate, and then vacuum-brazed for 30 minutes at 2100° F. (1149° C.). Upon removal from the furnace, the foil-coating was completely brazed to the metal substrate. Furnace cycle testing (FCT) was then carried out, with 1 cycle representing 45 minutes at 2000° F. (1093° C.). The testing demonstrated superior furnace cycle life for TBC systems applied in this manner, as compared to conventionally-applied air plasma-sprayed TBC systems. In an experimental run, failure for the comparative (conventionally-coated) sample occurred at about 360 FCT cycles. In marked contrast, the sample of the present invention did not fail until after 1700 FCT cycles.

EXAMPLE 2

A flat, cold-rolled steel plate was used in this example. The plate had dimensions of 22.9 cm×12.7 cm×0.15 cm. The plate was wire spray-coated with about 381 microns (0.015 inch) of aluminum, which would serve as an etchable release layer.

The plate was then air plasma sprayed with a NiCrAlY-type bond coat (0.010 inch/254 microns thickness). Deposition of the bond coat was followed by the air plasma-spraying of a zirconia-yttria TBC (0.015 inch/381 microns thickness). The plate is then cut into 1 inch (2.54 cm) disks.

One of the disks was immersed in a water bath of 50:50 wt. % potassium hydroxide:deionized water. The sample was bubbling furiously at the edges after 5 minutes. The sample was removed and inspected after 2 hours of etchant exposure. The bond coat/TBC was not detached from the substrate. However, an inspection of the sample with a stereo-microscope revealed that approximately 0.25 inch (0.64 cm) of the intermediate aluminum layer had been removed.

The sample was returned to the potassium hydroxide/water bath, and removed after another 6 hours. The bond coat/TBC had been freed from the substrate. The free-standing coating (foil) was then brazed to a nickel-based superalloy substrate, as described in Example 1. Furnace cycle testing (FCT) was then carried out as in the previous example. The testing again demonstrated superior furnace cycle life, with failure not occurring until after 1100 FCT cycles.

Preferred and exemplary embodiments have been described herein. However, other modifications of the invention may be apparent to those skilled in the art from these teachings. Therefore, it is intended that all such modifications which fall within the true spirit and scope of this invention be secured by the appended claims.

All of the patents, U.S. patent applications, articles, and texts mentioned above are incorporated herein by reference.

What is claimed:

1. A method for applying at least one bond coating to a surface of a metal-based substrate, comprising the following steps:
   (a) attaching a foil which comprises the bond coating to the substrate surface, and then
   (b) fusing the foil to the substrate surface, so that the bond coating adheres to the substrate.

2. The method of claim 1, wherein the foil is prepared by thermally spraying bond coating material onto a removable support sheet to form the foil followed by separation of the foil from the removable support sheet.

3. The method of claim 2, wherein thermal spraying is carried out by a technique selected from the group consisting of vacuum plasma deposition, high velocity oxy-fuel and air plasma spray.

4. The method of claim 1, wherein the foil is fused to the substrate surface by a brazing or welding technique.

5. The method of claim 4, wherein the brazing technique is carried out by applying a slurry of the braze composition to a surface of the foil, attaching the foil to the substrate surface so that the braze composition is in contact with the substrate surface, and then exposing the braze composition to a suitable brazing temperature.

6. The method of claim 4, wherein the brazing technique is carried out by applying a slurry of the braze composition to the substrate surface; then attaching the foil to the substrate surface so that the foil is in contact with the braze composition; and then exposing the braze composition to a suitable brazing temperature.

7. The method of claim 4, wherein the foil is fused to the substrate surface by a technique which comprises the following steps:
   (I) applying a layer of braze alloy material to a removable support sheet;
   (II) thermally spraying the bond coating material over the layer of braze alloy material, to form a bi-layer of braze alloy and bond coating material;
   (III) separating the bi-layer from the removable support sheet;
   (IV) attaching the bi-layer to the substrate surface so that braze alloy material is in contact with the substrate surface; and then
   (V) exposing the braze composition to a suitable brazing temperature.

8. The method of claim 4, wherein the brazing technique is carried out by attaching the foil which comprises the bond coating material to the substrate surface with a green braze tape, and then exposing the green braze tape to a suitable brazing temperature.

9. The method of claim 1, wherein the bond coating comprises an alloy of the formula MCrAlY, where M is selected from the group consisting of Fe, Ni, Co, and mixtures of any of the foregoing.

10. The method of claim 1, wherein the foil comprises at least two bond coatings.

11. The method of claim 10, wherein the two bond coatings comprise:
   (i) a dense, primary bond coating; and
   (ii) a secondary bond coating over the dense coating, having a microstructure which comprises an open network of interconnected pores.

12. The method of claim 11, wherein the dense, primary bond coating and the secondary bond coating each comprise an alloy of the formula MCrAlY, where M is selected from the group consisting of Fe, Ni, Co, and mixtures of any of the foregoing.

13. The method of claim 11, wherein the dense, primary bond coating of component (i) is applied by a vacuum plasma spray technique or by a high velocity oxy-fuel (HVOF) technique.

14. The method of claim 11, wherein the secondary bond coating is applied by a thermal spray technique.

15. The method of claim 14, wherein the thermal spray technique is a plasma spray process.

16. The method of claim 11, wherein the microstructure of the secondary bond coating has at least about 225 continuous strings of oxide greater than 25 microns in length, per square millimeter of sample, viewed in cross-section.

17. The method of claim 10, wherein the two bond coatings comprise:
   (i) a dense, primary bond coating; and
   (ii) a secondary bond coating over the dense coating, comprising platinum aluminide or platinum-nickel-aluminide.

18. The method of claim 10, wherein the foil comprises three bond coatings.

19. The method of claim 18, wherein the three bond coatings comprise:
   (i) a dense, primary bond coating;
   (ii) a secondary bond coating over the dense coating, having a microstructure which comprises an open network of interconnected pores; and
   (iii) a third bond coating over the secondary bond coating, comprising platinum aluminide or platinum-nickel-aluminide.

20. The method of claim 1, wherein the foil further comprises a thermal barrier coating, applied over the bond coating.

21. The method of claim 20, wherein the thermal barrier coating is zirconia-based.

22. The method of claim 20, wherein the thermal barrier coating is applied by thermal spray technique.

23. The method of claim 1, wherein the metal-based substrate is a superalloy.

24. The method of claim 23, wherein the superalloy is nickel-based.

25. The method of claim 1, wherein the metal-based substrate is a component of a turbine engine.

26. A method for applying a zirconia-based thermal barrier coating over a surface of a superalloy substrate, comprising the following steps:
   (a) attaching a foil which comprises at least one bond coating and an overlying zirconia-based thermal barrier coating to the substrate surface; and then
   (b) brazing the foil to the substrate surface.

27. The method of claim 26, wherein the foil comprises a dense, primary bond coating and a spongy secondary bond coating over the dense coating, said secondary bond coating having a microstructure which comprises an open network of interconnected pores, wherein each of said bond coatings is formed of an alloy material comprising MCrAlY, where M is selected from the group consisting of Fe, Ni, Co, and mixtures of any of the foregoing.

28. A method for repairing a worn or damaged thermal barrier coating system applied over a metal-based substrate, said method comprising the following steps:
   (i) removing the worn or damaged thermal barrier coating system from a selected area on the substrate;
   (ii) attaching a foil which comprises the replacement thermal barrier coating system to the substrate surface, covering the selected area; and then
   (iii) fusing the foil to the substrate, so that the thermal barrier coating system adheres to the selected area on the substrate, wherein the thermal barrier coating system comprises at least one bond coating for contact with the substrate, and an overlying thermal barrier coating applied over the bond coating.

29. The method of claim 28, wherein the fusing step is carried out by a brazing technique.

30. The method of claim 29, wherein the brazing technique is carried out by attaching the foil to the substrate surface with a green braze tape, and then exposing the green braze tape to a suitable brazing temperature.

31. The method of claim 29, wherein the brazing technique is carried out with a portable heating device.

32. The method of claim 29, wherein the foil is prepared by applying the thermal barrier coating system to a removable support sheet to form the foil, followed by separation of the foil from the removable support sheet.

* * * * *